United States Patent
Kwon et al.

(10) Patent No.: US 9,160,638 B2
(45) Date of Patent: Oct. 13, 2015

(54) METHOD AND APPARATUS FOR PERFORMING NON REAL TIME SERVICE IN DIGITAL BROADCAST SYSTEM

(75) Inventors: Hyoung Jin Kwon, Chungbuk (KR); Kug Jin Yun, Daejeon-si (KR); Gwang Soon Lee, Daejeon-si (KR); Hyun Jeong Yim, Seoul (KR); Kwanghee Jung, Gyeonggi-do (KR); Nam Ho Hur, Daejeon-si (KR); Soo In Lee, Daejeon-si (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 387 days.

(21) Appl. No.: 13/287,685

(22) Filed: Nov. 2, 2011

(65) Prior Publication Data

US 2012/0110404 A1    May 3, 2012

(30) Foreign Application Priority Data

Nov. 2, 2010 (KR) .......... 10-2010-0108302
Nov. 1, 2011 (KR) .......... 10-2011-0113000

(51) Int. Cl.
*H04L 1/18* (2006.01)
*H04L 12/26* (2006.01)

(52) U.S. Cl.
CPC .................. *H04L 43/0823* (2013.01)

(58) Field of Classification Search
CPC ..... H04L 1/1887; H04L 1/1812; H04L 1/188; H04L 1/1671; H04L 1/1854
USPC ........................................ 714/749
See application file for complete search history.

(56) References Cited

U.S. PATENT DOCUMENTS

| | | | | |
|---|---|---|---|---|
| 5,222,061 A | * | 6/1993 | Doshi et al. ................... | 370/394 |
| 6,148,005 A | * | 11/2000 | Paul et al. ..................... | 370/469 |
| 2002/0080170 A1 | * | 6/2002 | Goldberg et al. ............. | 345/748 |
| 2002/0095636 A1 | | 7/2002 | Tatsumi | |
| 2005/0210101 A1 | * | 9/2005 | Janik ............................. | 709/203 |
| 2008/0222678 A1 | * | 9/2008 | Burke et al. ................... | 725/44 |
| 2008/0253387 A1 | * | 10/2008 | Liang et al. ................... | 370/412 |
| 2009/0168683 A1 | * | 7/2009 | Franceschini et al. ........ | 370/312 |
| 2009/0249222 A1 | * | 10/2009 | Schmidt et al. ............... | 715/751 |
| 2009/0276674 A1 | * | 11/2009 | Wei et al. ...................... | 714/749 |
| 2013/0254614 A1 | * | 9/2013 | Kumar et al. ................. | 714/748 |

FOREIGN PATENT DOCUMENTS

KR    20060130360 A    12/2006
KR    20070012593 A    1/2007

* cited by examiner

*Primary Examiner* — Albert Decady
*Assistant Examiner* — Enam Ahmed
(74) *Attorney, Agent, or Firm* — Nelson Mullins Riley & Scarborough LLP

(57) ABSTRACT

Disclosed herein is a non real-time broadcast receiving system. The system includes: a non real-time service decoder dividing received non real-time service content into a transmission block according to a protocol; a service content manager monitoring whether the receive of the non real-time service content stops and acknowledging a schedule regarding whether a portion with errors in the non real-time service content is retransmitted; a memory storing a portion without errors in the non real-time service content; a file checker checking whether errors are produced during the receive of the non real-time service contents and determining whether the portion with errors in the non real-time service content is retransmitted; a retransmission request signal generator generating a retransmission request signal; a return channel transmitter transmitting the retransmission request signal; and a return channel receiver receiving data corresponding the portion with error.

20 Claims, 5 Drawing Sheets

METHOD AND APPARATUS FOR PERFORMING NON REAL TIME SERVICE IN DIGITAL BROADCAST SYSTEM

CROSS-REFERENCE TO RELATED APPLICATIONS

This application claims the benefit of priority of Korean Patent Application No. 10-2010-0108302 filed on Nov. 2, 2010, and, Korean Patent Application No. 10-2011-0113000 filed on Nov. 1, 2011, all of which are incorporated by reference in their entirety herein.

BACKGROUND OF THE INVENTION

1. Field of the Invention

The present invention relates to digital broadcast, and more particularly, to non real-time broadcast services in digital broadcast.

2. Related Art

As one of the digital broadcast standards, an advanced television system committee (ATSC) prepares non real-time (NRT) services capable of providing application data services at any time after previously downloading various content files to a terminal while providing real-time broadcast using an existing broadcast standard. The ATSC uses File Delivery over Unidirectional Transport (FLUTE) (see Internet Engineering Task Force (IETF) RFC 3926) standard so as to download beforehand the content files to the terminal through an internet protocol (IP) stream.

Meanwhile, unlike typical broadcast, such as a terrestrial wave, a cable, a satellite network, or the like, that distributes contents to broadcasting, a two-way broadcast service through a broadcast network capable of implementing two-way communication represented by an internet protocol TV (IPTV) in an Internet network has newly appeared. The two-way broadcast service commonly uses multicasting or uni-casting transferring contents to a terminal having a specific IP address regardless of an open network or a private network managed by a business. However, the multicasting or unicasting scheme is small in the maximum number of users that may be accessed simultaneously and coverage, as compared with the broadcasting scheme. In addition, since the multicasting or unicasting scheme does not have an independent channel that is directly managed and shares resources with multiple users in a single network, the data rate is degraded. Therefore, it is difficult to ensure quality of service (QoS) for a high definition video. On the other hand, using the two-way communication may retransmit a portion with errors and recover the portion and may provide other contents to a user or provide (for example, a video on demand (VOD) service) services only at the time of the request of the user even with the same contents.

However, a general digital broadcast is basically a broadcast scheme and is a uni-direction. When there are errors in the received broadcast contents, all the contents are not used or the contents needs to be reproduced in the state in which errors are present. These errors may occur due to a change in a physical channel of a broadcast network. In particular, the broadcast contents may be received only through a specific broadcast channel, the broadcast content cannot be received any more when the user randomly changes the channel. In addition, various services provide through a limited frequency band in the broadcast network and therefore, broadcasting through the repetition of the same contents is also limited. Therefore, there are errors in a portion of the broadcast content, there is a strong possibility that the broadcast content is not received.

SUMMARY OF THE INVENTION

The present invention provides a method and an apparatus for performing non real-time services without errors in digital broadcast.

The present invention also provides a method and an apparatus for requesting and retransmitting an error portion of content with errors in digital broadcast.

In an aspect, there is provided a non real-time broadcast receiving system, including: a non real-time service decoder dividing received non real-time service content into a transmission block according to a protocol; a service content manager monitoring whether the receive of the non real-time service content stops and acknowledging a schedule regarding whether a portion with errors in the non real-time service content is retransmitted; a memory storing a portion without errors in the non real-time service content when the receive of the non real-time service content stops; a file checker checking whether errors are produced during the receive of the non real-time service content and determining whether the portion with errors in the non real-time service content is retransmitted; a retransmission request signal generator generating a retransmission request signal requesting the retransmission of the portion with errors in the non real-time service content; a return channel transmitter transmitting the retransmission request signal through a return channel network; and a return channel receiver receiving data corresponding the portion with error in the non real-time service content retransmitted by the retransmission request signal through the return channel network.

The file checker may check IDs of symbols configuring the transmission block by using at least one of the number of transmission blocks, a length of the transmission blocks, and a source block number (SBN) and an encoding symbol identifier (ID) configuring the transmission block and may check and store a position of the symbol with errors among the symbols configuring the transmission block.

The information regarding the number of transmission blocks and the length of the transmission block may be included in a packet header.

The SBN of the symbol and the encoding symbol ID configuring the transmission block may be included in front of the symbol encoded by a forward error correction (FEC) payload identifier (ID).

The retransmission request signal may be generated according to a communication protocol of the return channel network.

The retransmission request signal may include at least one of an address of a return channel server retransmitting the data corresponding to the portion with errors in the non real-time service content, a file name including data corresponding to the portion with errors in the non real-time service content, and a packet number of the data corresponding to the portion with errors in the non real-time service content.

The non real-time broadcast receiving system may further include a return channel packet checker determining whether the packet of the data corresponding to the portion with errors in the non real-time service content retransmitted by the retransmission request signal is accurately retransmitted.

The retransmission request signal generator may again generate the retransmission request signal so that the retransmission acknowledgement signal regarding whether the packet of the data corresponding to the portion with errors in the non real-time service content retransmitted from the return channel packet checker is accurately retransmitted is included in the retransmission request signal; and the return channel transmitter may transmit the retransmission request signal including the retransmission acknowledgement signal through the return channel network.

In another aspect, there is provided a non real-time broadcast receiving method, including: monitoring a receive of a transmission block of a non real-time broadcast service content and checking whether all the data of the transmission block are received without errors; inserting a position of a symbol with errors into a retransmission request list when errors are produced during the receive of the transmission block and storing the symbol received without errors in a memory; acknowledging a transmission schedule whether data including the symbol with errors are received; and generating a retransmission request signal requesting retransmission for all the data inserted into the retransmission request list to a return channel server through a return channel, when there is no transmission schedule re-receiving the data including the symbol with the errors; and re-receiving the data inserted into the retransmission request list from the return channel server.

The non real-time broadcast receiving method may further include storing each data in a position at which the errors of the memory are produced and deleting each of the data from the retransmission request list, when all the data inserted into the retransmission request list is re-received without errors.

The non real-time broadcast receiving method may further include recovering an original source file block by decoding the transmission block stored in the memory.

The decoding may be FEC decoding.

The non real-time broadcast receiving method may further include retransmitting the retransmission request signal when all the data inserted into the retransmission request list is not re-received without errors.

The non real-time broadcast receiving method may further include checking IDs of symbols configuring the transmission block by using at least one of the number of transmission blocks, a length of the transmission blocks, and a SBN and an encoding symbol ID configuring the transmission block to acknowledge whether all the data of the transmission block are received without errors.

The information regarding the number of transmission blocks and the length of the transmission block may be included in a packet header.

The SBN of the symbol and the encoding symbol ID configuring the transmission block may be included in front of the symbol encoded by a FEC payload ID.

The retransmission request signal may be generated according to a communication protocol of the return channel.

The retransmission request signal may include at least one of an address of a return channel server retransmitting the data including the symbol with errors, a file name including data including the symbol with errors in the non real-time service content, and a packet number of the data including the symbol with errors.

The non real-time broadcast receiving method may further include again generating the retransmission request signal so that the retransmission acknowledgement signal regarding whether the packet of the data including the symbol with errors is accurately retransmitted is included in the retransmission request signal.

The non real-time broadcast receiving method may further include transmitting the retransmission request signal including the retransmission acknowledgement signal to the return channel server through the return channel.

DESCRIPTION OF EXEMPLARY EMBODIMENTS

Figure 1:
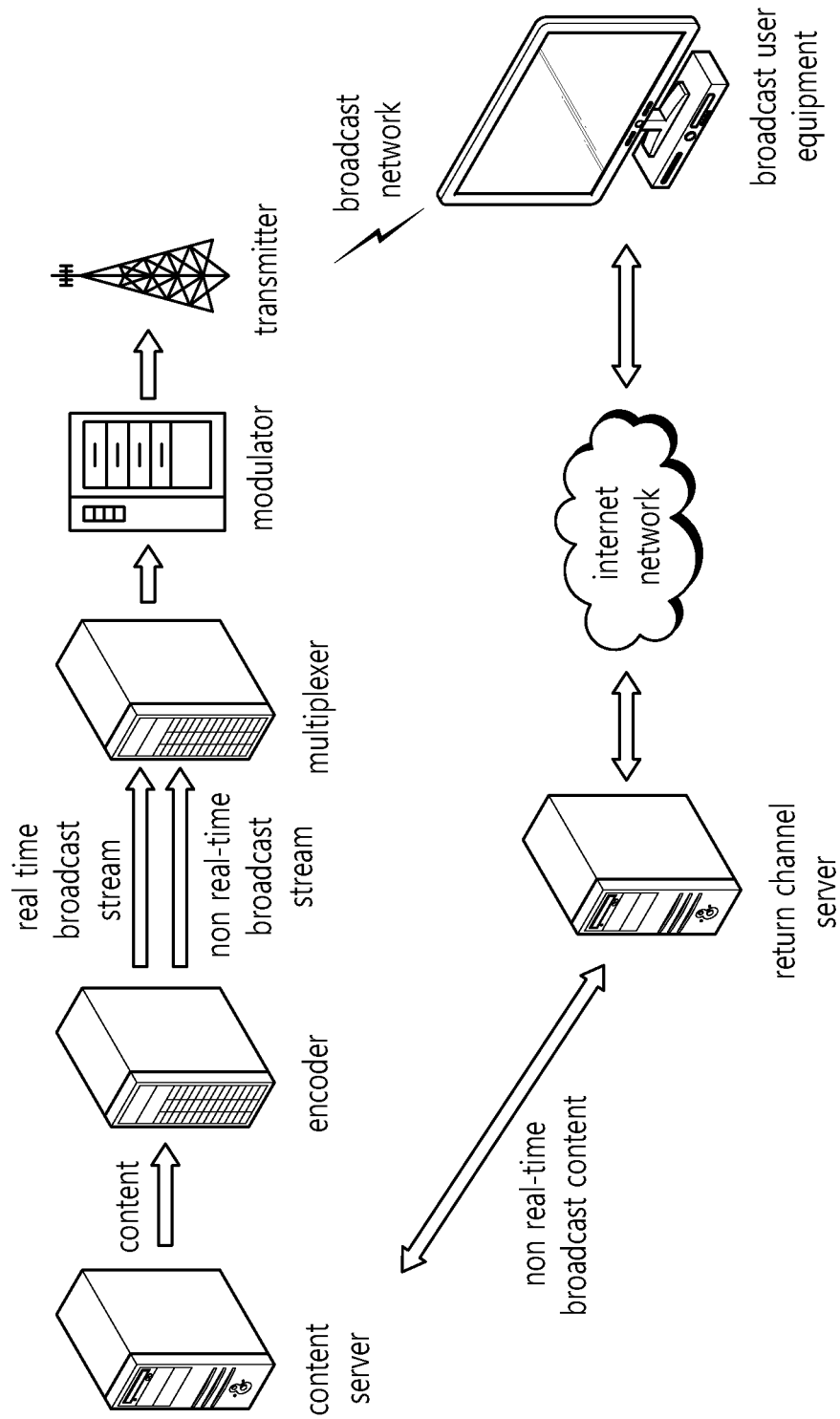
FIG. 1 is a conceptual diagram showing a non real-time broadcast service system to which an exemplary embodiment of the present invention is applied.

Hereinafter, embodiments of the present invention will be described in detail with reference to the accompanying drawings so that those skilled in the art may easily practice the present invention. However, the present invention may be modified in various different ways and is not limited to the embodiments provided in the present description. In the accompanying drawings, portions unrelated to the description will be omitted in order to obviously describe the present invention, and similar reference numerals will be used to describe similar portions throughout the present specification.

FIG. 1 is a conceptual diagram showing a non real-time broadcast service system to which an exemplary embodiment of the present invention is applied. It is assumed that data broadcast or non real-time broadcast services such as advanced television system committee (ATSC) non real time (NRT) is transmitted simultaneously with non real-time broadcast services.

Referring to FIG. 1, contents are stored in a content server. The contents stored in the content server are encoded into a real-time broadcast stream type and a non real-time broadcast stream type in an encoder and the real-time broadcast stream and non real-time broadcast stream are multiplexed in a multiplexer and are modulated in a modulator and a transmitter, respectively, and are then transmitted to a terminal through a broadcast network. A receiver of the terminal selects a channel by a tuner to receive a broadcast stream through the selected channel, thereby receiving the broadcast services.

Since the non real-time broadcast service and the real-time broadcast service use physically different channels, the non real-time broadcast services stop at the time of the movement from the non real-time service channel to the real-time service channel when the non real-time broadcast service and the real-time broadcast service may not simultaneously receive through the tuner of the terminal. The terminal does not receive a portion of the contents while the terminal receives the contents. In addition, errors may occur in the received contents during the movement of the service channel receiving the contents.

In this case, the terminal detects the errors of the content to request and re-receive a portion to be retransmitted through the return channel that may perform the two-way broadcast and recovers the contents of the portion with errors, thereby providing the non real-time broadcast services without errors.

In this case, the non real-time broadcast service does not mean that the broadcast terminal is not necessarily directly connected to the return channel. When another apparatus in which the broadcast terminal and the network are formed are connected to the return channel server, the contents may be recovered through the apparatus. Since the tuner included in the terminal is one, the contents with errors may be recovered even in the case of accessing only a single broadcast channel at one time.

In this case, the broadcast network in which the signals are transmitted from the transmitter of FIG. 1 to the broadcast terminal includes the existing broadcast networks or a next-generation broadcast network. The Internet network transmitting the signals between the return channel server and the broadcast terminal may be an upload channel such as an Internet protocol network, a wired and wireless network, a cable network, or the like and may be a network such as a next-generation communication network/Internet network/ broadcast network, a communication broadcasting convergence network, or the like. In order to apply the exemplary embodiment of the present invention, the signals are transmitted to be appropriate for a communication protocol meeting each network (channel).

Figure 2:
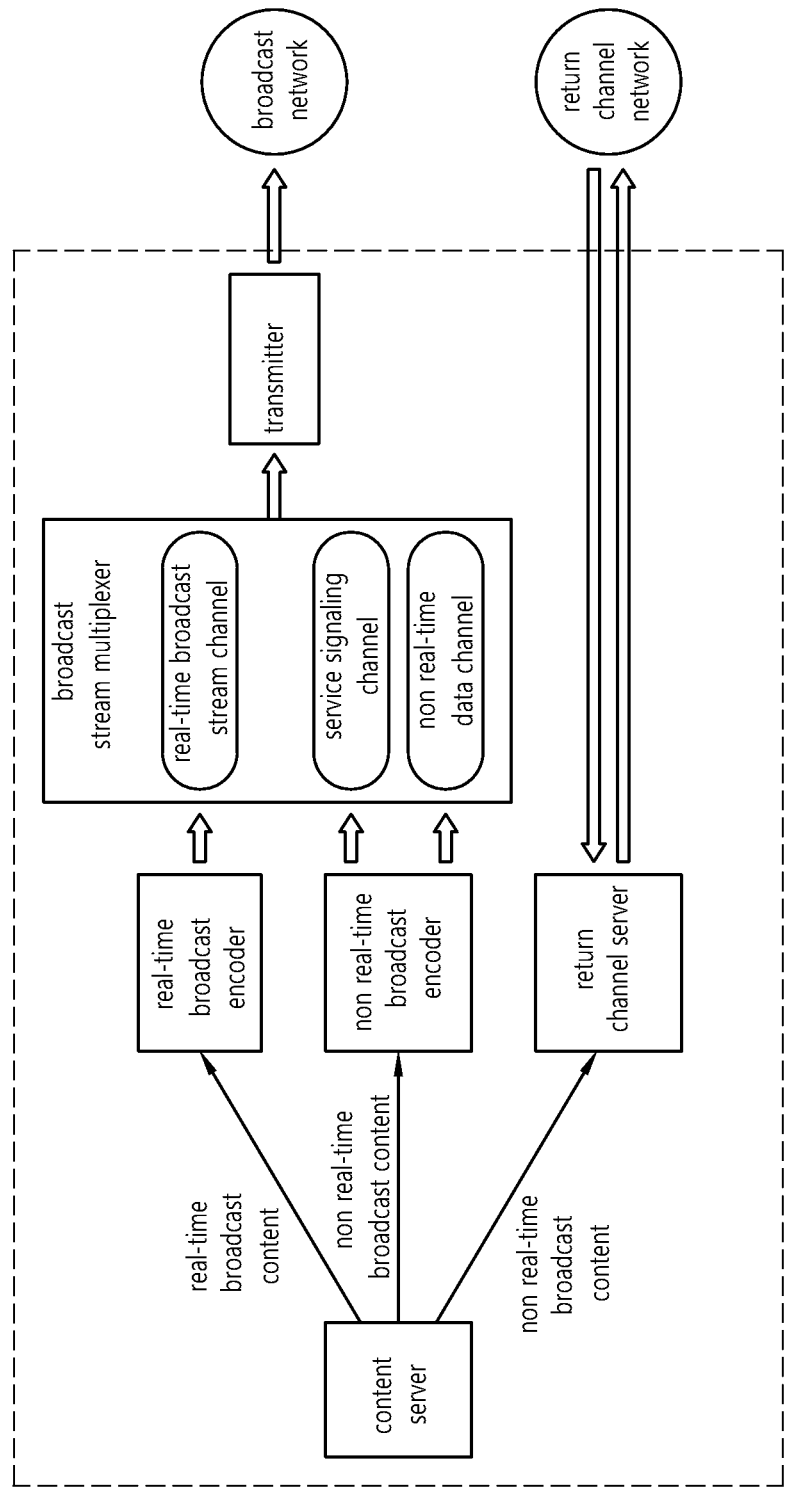
FIG. 2 is a diagram showing a configuration of a non real-time broadcast transmitting system according to an exemplary embodiment of the present invention.

FIG. 2 is a diagram showing a configuration of a non real-time broadcast transmitting system according to an exemplary embodiment of the present invention. The example may be a base station.

Referring to FIG. 2, the broadcast contents provided by a content provider are transmitted to the encoder from the content server according to a service type and are encoded in the encoder The real-time broadcast contents are encoded in a real-time broadcast encoder and the non-real time broadcast contents are encoded in a non real-time broadcast encoder. In this configuration, non real-time service relating signaling information is also encoded in the non real-time broadcast encoder.

The encoded real-time broadcast stream, the non real-time data stream, and the service signaling are multiplexed in a broadcast stream multiplexer. The encoded real-time broadcast stream, the non real-time data stream, and the service signaling are broadcast to viewers through the broadcast network from the transmitter.

In addition, the return channel sever receives the non real-time broadcast contents from the content server so as to recover a portion in which the non real-time broadcast service is incomplete (errors are produced). The portion is broadcast to the viewers through the return channel network from the return channel server.

When the request information of each viewer regarding the content name to be required and the portion in which contents need to be recovered are transmitted to the return channel server, the return channel server transmits the data of the portion in which the contents need to be recovered according to the transmitted information to the viewer through the return channel network (for example, IP network).

In this case, the non real-time broadcast service content of the return channel server may be configured by multimedia data, text, or the like, such as still picture, moving picture, CG, or the like. Each data is prepared by being encoded by a predetermined scheme. In this case, the non real-time service encoder serves to encode the non real-time broadcast service content by the predetermined data broadcast standard so as to provide the non real-time services. For example, in the case of the ATSC NRT, the non real-time service encoder serves to encode the content files by the file delivery over unidirectional transport (FLUTE) protocol, or the like. In addition, the non real-time service encoder serves to generate signaling and metadata relating to the non real-time services. This means a function of generating a service map table-mobile/ handheld (SMT-M/H), a non real time information table (NTR-IT), or the like, so as to inform the terminals of the service configuration information, the contents related information, or the like.

The broadcast stream multiplexer multiplexes the tables including the service related information and the encoded content data packets using the separate signaling channel and the data channel and also multiplexes the real-time broadcast stream.

They are subjected to the processes of the channel encoding, the modulation, or the like, in the transmitter and are transmitted through the broadcast channel. In the case of the ATSC NRT, the data channel and the signaling channel are formed by IP packets in a digital storage media-command and control (DSM-CC) addressable section of a moving picture experts group-transport stream (MPEG-TS) and is divided by an IP address and a user datagram protocol (UDP) port number.

The signaling channel is transmitted to the IP packet representing the predetermined IP address and the UDP port and is configured by a service map table (SMT), a non real-time information table (NRT-IT) and has no data packet. The SMT carries the configuration information of all of the services of the IP subnet. The contents related to each service are transmitted through the FLUTE protocol, which exhibits a destination IP multicast address and UDP port number of the session and also include the FLUTE session information.

The NRT-IT describing the information regarding the contents is linked with the SMT through the service ID and is configured in a unit for presentation called a content item. Since the content item may be configured by several content files, the content linkage value is used for referring to whether each file is actually transmitted to any address. Since the content linkage values are included even when the information regarding the included files is described through the file delivery table of the FLUTE session, the files may be identified by matching the content linkage values.

Figure 3:
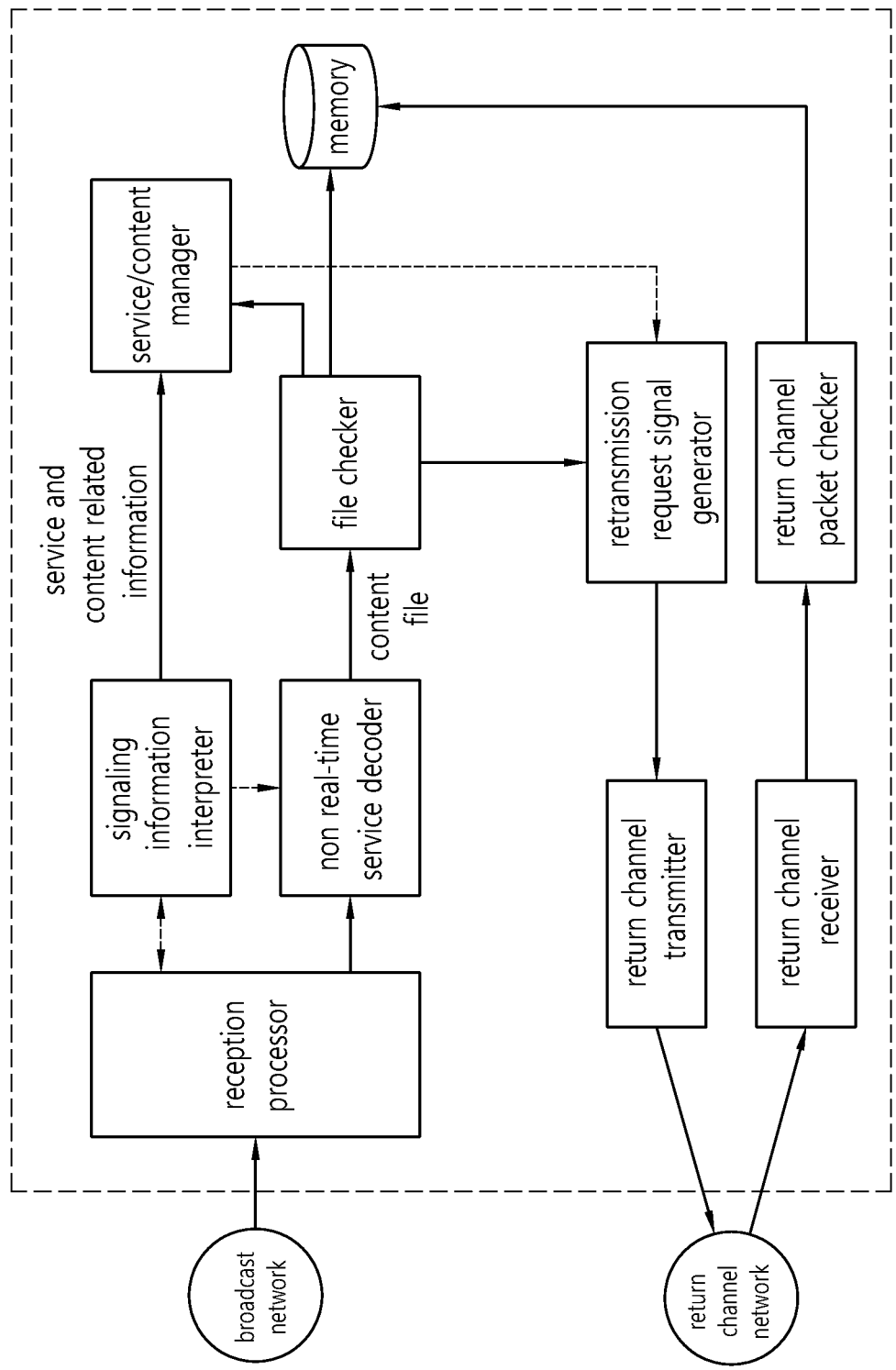
FIG. 3 is a diagram showing a configuration of a non real-time broadcast receiving system according to an exemplary embodiment of the present invention.

FIG. 3 is a diagram showing a configuration of a non real-time broadcast receiving system according to an exemplary embodiment of the present invention.

Referring to FIG. 3, a receive processor receives a radio frequency (RF) signal, performs demodulation, and performs channel decoding. In addition, the services selected by the user are extracted from the multiplexed stream.

A signaling information interpreter interprets signaling table values such as the SMT, the NRT-IT, or the like, transmitted through the signaling channel. The channel transmitting the data of the non real-time service may be appreciated through the SMT and the IP packet may be extracted. In addition, the service and contents related information is transmitted to the service/contents manager.

The non real-time service decoder receives the information required for content download from the service information interpreter and then, downloads the content files required for the non real-time services at a valid time according to the content file transmission protocol (for example: FLUTE). For example, the FDT is first downloaded and the FDT is interpreted and then, the positions of each content are detected, thereby downloading the corresponding content files.

The downloaded files are divided into a transport block according to the FLUTE protocol. The block is encoded according to an application layer and a forward error correction (FEC) and is transmitted to a lower layer in a symbol unit. Therefore, there is a need to know whether the symbol received in the lower layer corresponds to an n-th symbol of which transmission block, when intending to confirm whether the file is received without errors.

To this end, two types of information are required: (1) the information regarding the number of transmission blocks and a length of each transmission block and (2) a source block number (SBN) and an encoding symbol ID (ESI) relating to the specific symbol. The information regarding the number of transmission blocks and the length of each transmission block is included in the packet header and the source block number (SBN) and the encoding symbol ID (ESI) relating to the specific symbol are included in front of the symbol encoded by an FEC payload ID.

The file checker checks the ID of the received symbol using the information regarding the number of transmission blocks and the length of each transmission block and the source block number (SBN) and the encoding symbol ID (ESI) relating to the specific symbol and stores the position (position on data) on the file of the symbol with errors when there is the symbol with errors.

A service/content manager monitors whether the packets of the non real-time service during the receiving are received well. The service/content manager checks whether the receiving of the services and contents stop as the user moves to the new channel. When the receiving of the services or the contents stops, the portion of the files received without errors is stored in the memory. In addition, the file checker acknowledges whether errors are recovered in the broadcast network using a carousel schedule of the content to which the errors are reported and determines whether the defect portions of the files are finally retransmitted.

When the retransmission request signal generator receives the determination that there are errors in a portion of the packet or the file from the service/content manager, the file checker, or the return channel packet checker, the retransmission request signal generator generates the retransmission request signal for the packet or the portion in which the errors of the file are produced. In this case, the retransmission request signal is generated according to the communication protocol of the return channel and is data necessarily including the address of the return channel server, the file name (for example, uniform resource identifier (URI), and the portion or the packet number of the file to which the retransmission is requested. In this case, the address of the return channel server may be generated using a descriptor of each content of NRT-IT. The case of the ATSC NRT may be used by writing the URL on an internet location descriptor (ILC). It may be appreciated when the FLUTE such as the use of a content location field of the FLUTE FDT is transmitted. The portion of the file to which the retransmission is requested may designate the symbol from the SBN and ESI and may represent the file interval by byte information.

The return channel transmitter transmits the retransmission request signal generated from the retransmission request signal generator to the return channel server through the return channel network.

When performing the retransmission through the return channel network from the return channel server, the return channel receiver receives the retransmitted signal. Since errors may be produced in the transmitting packet while the retransmission signal is received, the return channel packet checker determines whether the packets are accurately received, instead of the retransmission request signal like the protocol such as the transmission control protocol (TCP). In this case, the return channel packet checker generates the receive acknowledgement signal and transmits the generated receive acknowledgement signal to the return channel server through the retransmission request signal generator. It may be informed to the return channel server by the above-mentioned two-way communication protocol that the transmission of the packet succeeds.

Figure 4A:
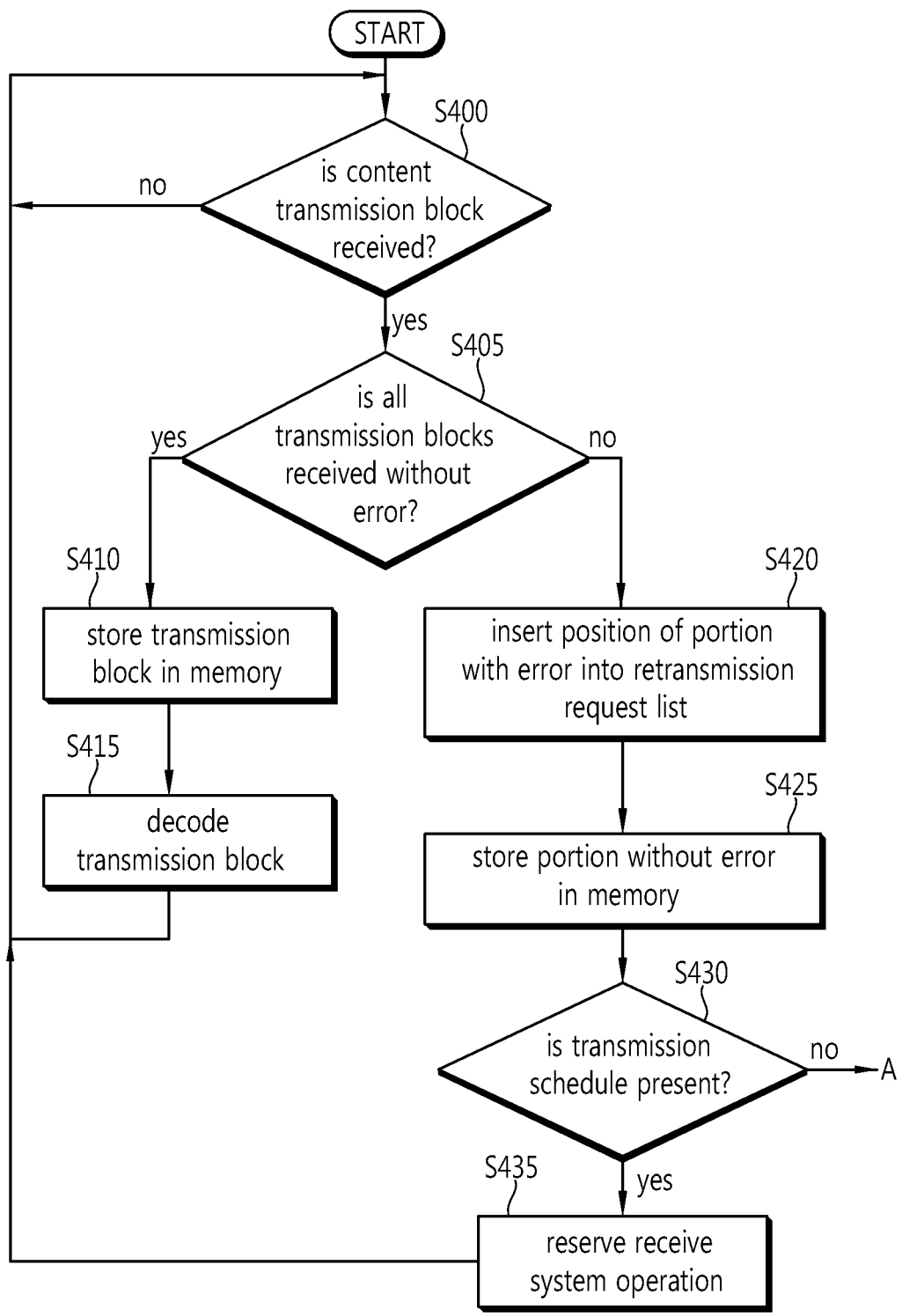
FIGS. 4A and 4B are a flow chart showing a process of transmitting and managing contents in the non real-time broadcast receiving system according to the exemplary embodiment of the present invention.
Figure 4B:
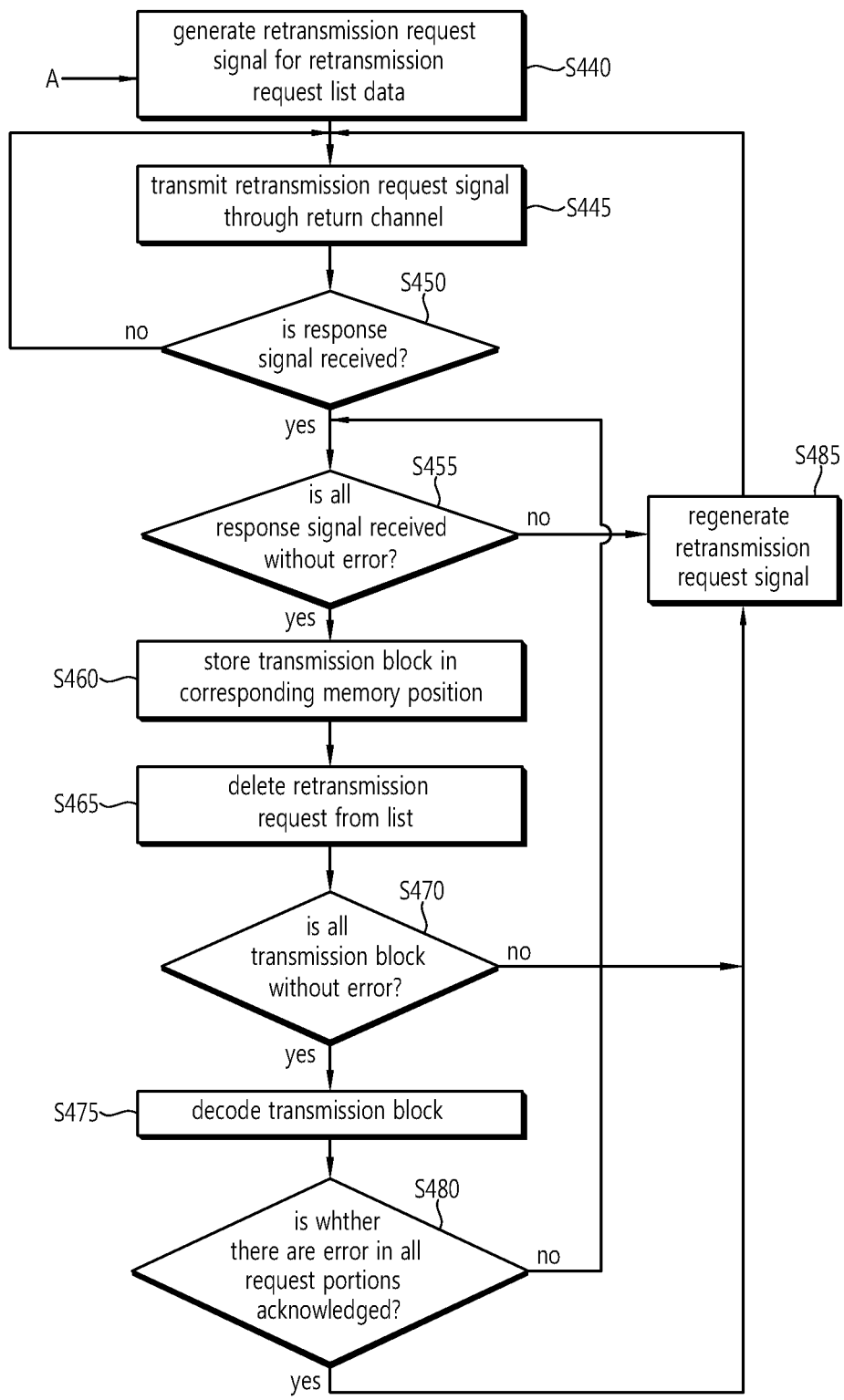

FIGS. 4A and 4B are a flow chart showing a process of transmitting and managing contents in the non real-time broadcast receiving system according to the exemplary embodiment of the present invention.

Referring to FIGS. 4A and 4B, it is continuously monitored whether the transmission block of content of the non real-time broadcast service is received at step S400. If it is determined that the received transmission block is present, it is acknowledged that all the data of the block are received without errors at step S405.

When all the transmission blocks are received without errors, the transmission block is stored in the memory at step S410, and the original source file block is recovered by performing the decoding (for example, FEC decoding) for the stored transmission block at step S415. It is monitored whether the next transmission block of the content is again received at step S400.

At step S405, when errors are present in the transmission block (that is, when the portion abstracted in the transmission block of the received content is present), the position of the portion (for example, symbol) with errors is inserted into the retransmission request list at step S420 and the remaining portions (symbols) received without errors in the transmission block are stored in the memory at step S425.

Then, it is acknowledged whether the portion with errors is retransmitted from the transmitter or the transmission schedule is present by acknowledging the transmission schedule of the content at step S430. If it is acknowledged that the transmission schedule retransmitting the portion with errors, the receiving system operation is reserved at step S440, and at S400, the receive operation is performed at a reserved time to continuously monitor whether the content transmission block of the retransmission request list is received. This is an operation solving the receive for the portion with errors by the retransmission.

At step S430, when there is no schedule retransmitting the portion with errors, the retransmission request signal for all the data inserted into the retransmission request list is generated at step S440 and transmits the retransmission request signal through the return channel at step S445.

In addition, it is acknowledged whether the response signal for the retransmission request signal of the portion with errors are received through the return channel within the defined time at step S450. This is to acknowledge whether the retransmission request signal is smoothly transmitted. If the response signal for the retransmission request signal is not received as it is, the retransmission request signal is repeatedly transmitted at S445.

If it is acknowledged that the retransmission request signal is received, it is acknowledged whether all the data of the retransmission request list are received without errors at step S455. When all the data of the retransmission request list is received without errors, each of the data of the received retransmission request list is stored at the position of the corresponding transmission block of the memory, that is, the position of the portion with errors at step S460, and the stored data portion (symbol) is deleted from the retransmission request list at step S465.

At step S455, when receiving the data of the retransmission request list cause the errors, the retransmission request signal is regenerated by inserting the portion with errors into the retransmission request list at step S485. The regenerated retransmission request signal is transmitted through the return channel at step S445.

In order to acknowledge whether the transmission block to which the portion (symbol) deleted from the retransmission request list belongs needs to be retransmitted, it is acknowledged whether the corresponding transmission block is received without errors at step S470. That is, it is acknowledged whether there is the retransmission request for other portions (symbols) other than the portion deleted from the transmission block. If it is determined that all the portions of the transmission block are received without errors since a portion (symbol) of the corresponding transmission block is no further present in the retransmission request list, the original source file block is recovered by performing the decoding (for example, FEC decoding) for the transmission block stored in the memory at step S475.

At step S470, when there are errors in the receive of the corresponding transmission block as a result of acknowledging whether all the corresponding transmission blocks are received without errors, the retransmission request signal is regenerated by inserting the portion with errors into the retransmission request list at step S485. The regenerated retransmission request signal is transmitted through the return channel at step S445.

It is acknowledged whether all the possible errors for the retransmitted portion (symbol) included in the response signal received at S450 are checked (S480). If it is determined that all the possible errors for all the data (symbol) are acknowledged, the retransmission request signal for the list of the data with errors is again generated (S485) and is retransmitted to the return channel (S445).

At S480, when the portion to be checked still remains, it is repeatedly acknowledged whether all the data of the retransmission request list are received without errors at step S455.

As described above, the non real-time broadcast service requesting and re-receiving the retransmission by detecting the errors of the unidirectional broadcast content packets in the terminal of the present invention may request and re-receive the portion of the content which causes errors or are not received due to all the matters such as the channel environment change of the unidirectional network or the channel switching of the user, or the like or requests the portion through two way, thereby providing the non real-time broadcast service without errors.

In addition, the non real-time service can use all the advantages of the unidirectional broadcast network and the two-way broadcast network to effectively use the resource of two networks, in particular, is not sensitive to delay and can transmit the content without errors in the service transmitting the broadcast content in non real-time.

In addition, the non real-time service may be used for the method for recovering errors for the contents received for the on-air network in the broadcast service using the hybrid network using both of the on-air network such as a terrestrial wave and the two-way broadcast such as an Internet network.

As set forth above, the exemplary embodiments of the present invention can transmit contents to many users, if possible, using the unidirectional broadcasting and can retransmit only the portion requested by the terminal that does not receive all the contents due to the errors to the terminal.

The exemplary embodiments of the present invention can smoothly transmit the non real-time broadcast services to the terminal not receiving the non real-time broadcast services through another two-way network by allowing the terminal to detect the broadcast services that are not transmitted to the terminal, since the channel receiving the non real-time broadcast services and the channel receiving the real-time broadcast services different are different.

In addition, the exemplary embodiments of the present invention can recover the errors for the contents received in the on-air network in the broadcast services by using the hybrid network using both of the on-air network (for example, terrestrial broadcast network) and the network capable of performing the two-way broadcast (for example, Internet network).

In the above-mentioned exemplary embodiments, the methods are described based on the series of steps or the flow charts shown by a block, but the exemplary embodiments of the present invention are not limited to the order of the steps and any steps may be performed in order different from the above-mentioned steps or simultaneously. In addition, a person skilled in the art to which the present invention pertains may understand that steps shown in the flow chart are not exclusive and thus, may include other steps or one or more step of the flow chart may be deleted without affecting the scope of the present invention.

The above-mentioned embodiments include examples of various aspects. Although all possible combinations showing various aspects are not described, it may be appreciated by those skilled in the art that other combinations may be made. Therefore, the present invention should be construed as including all other substitutions, alterations and modifications belonging to the following claims.

What is claimed is:

1. A non real-time broadcast receiving system, comprising:
   a non real-time service decoder dividing received non real-time service content into a transmission block according to a protocol;
   a service content manager monitoring whether the receive of the non real-time service content stops and acknowledging a schedule regarding whether a portion with errors in the non real-time service content is retransmitted;
   a memory storing a portion without errors in the non real-time service content when the receive of the non real-time service content stops;
   a file checker checking whether errors are produced during the receive of the non real-time service content and determining whether the portion with errors in the non real-time service content is retransmitted;
   a retransmission request signal generator generating a retransmission request signal requesting the retransmission of the portion with errors in the non real-time service content, when it is acknowledged that the schedule is not present;
   a return channel transmitter transmitting the retransmission request signal through a return channel network; and
   a return channel receiver receiving data corresponding to the portion with error in the non real-time service content retransmitted by the retransmission request signal through the return channel network,
   wherein the portion with errors in the non real-time service content is received at a reserved time without transmitting the retransmission request signal when it is acknowledged that the schedule is present.

2. The non real-time broadcast receiving system of claim 1, wherein the file checker checks IDs of symbols configuring the transmission block by using at least one of the number of transmission blocks, a length of the transmission blocks, and a source block number (SBN) and an encoding symbol identifier (ID) configuring the transmission block and checks and stores a position of the symbol with errors among the symbols configuring the transmission block.

3. The non real-time broadcast receiving system of claim 2, wherein the information regarding the number of transmission blocks and the length of the transmission block is included in a packet header.

4. The non real-time broadcast receiving system of claim 2, wherein the SBN of the symbol and the encoding symbol ID configuring the transmission block are included in front of the symbol encoded by a forward error correction (FEC) payload identifier (ID).

5. The non real-time broadcast receiving system of claim 1, wherein the retransmission request signal is generated according to a communication protocol of the return channel network.

6. The non real-time broadcast receiving system of claim 1, wherein the retransmission request signal includes at least one of an address of a return channel server retransmitting the data corresponding to the portion with errors in the non real-time service content, a file name including data corresponding to the portion with errors in the non real-time service content, and a packet number of the data corresponding to the portion with errors in the non real-time service content.

7. The non real-time broadcast receiving system of claim 1, further comprising a return channel packet checker determining whether the packet of the data corresponding to the portion with errors in the non real-time service content retransmitted by the retransmission request signal is accurately retransmitted.

8. The non real-time broadcast receiving system of claim 7, wherein the retransmission request signal generator again generates the retransmission request signal so that the retransmission acknowledgement signal regarding whether the packet of the data corresponding to the portion with errors in the non real-time service content retransmitted from the return channel packet checker is accurately retransmitted is included in the retransmission request signal; and the return channel transmitter transmits the retransmission request signal including the retransmission acknowledgement signal through the return channel network.

9. A non real-time broadcast receiving method, comprising:

monitoring a receive of a transmission block of a non real-time broadcast service content and checking whether all the data of the transmission block are received without errors;

inserting a position of a symbol with errors into a retransmission request list when errors are produced during the receive of the transmission block and storing the symbol received without errors in a memory;

acknowledging a transmission schedule whether data including the symbol with errors are re-received;

performing receiving operation for the position of a symbol with errors in the non real-time service content at a reserved time when it is acknowledged that the transmission schedule is present;

generating a retransmission request signal requesting retransmission for all the data inserted into the retransmission request list to a return channel server through a return channel, when it is acknowledged that the schedule is not present; and re-receiving the data inserted into the retransmission request list from the return channel server.

10. The non real-time broadcast receiving method of claim 9, further comprising storing each data in a position at which the errors of the memory are produced and deleting each of the data from the retransmission request list, when all the data inserted into the retransmission request list is re-received without errors.

11. The non real-time broadcast receiving method of claim 10, further comprising recovering an original source file block by decoding the transmission block stored in the memory.

12. The non real-time broadcast receiving method of claim 11, wherein the decoding is FEC decoding.

13. The non real-time broadcast receiving method of claim 9, further comprising retransmitting the retransmission request signal when all the data inserted into the retransmission request list is not re-received without errors.

14. The non real-time broadcast receiving method of claim 9, further comprising checking IDs of symbols configuring the transmission block by using at least one of the number of transmission blocks, a length of the transmission blocks, and a SBN and an encoding symbol ID configuring the transmission block to acknowledge whether all the data of the transmission block are received without errors.

15. The non real-time broadcast receiving method of claim 14, wherein the information regarding the number of transmission blocks and the length of the transmission block is included in a packet header.

16. The non real-time broadcast receiving method of claim 14, wherein the SBN of the symbol and the encoding symbol ID configuring the transmission block are included in front of the symbol encoded by a FEC payload ID.

17. The non real-time broadcast receiving method of claim 9, wherein the retransmission request signal is generated according to a communication protocol of the return channel.

18. The non real-time broadcast receiving method of claim 9, wherein the retransmission request signal includes at least one of an address of a return channel server retransmitting the data including the symbol with errors, a file name including data including the symbol with errors in the non real-time service content, and a packet number of the data including the symbol with errors.

19. The non real-time broadcast receiving method of claim 9, further comprising again generating the retransmission request signal so that the retransmission acknowledgement signal regarding whether the packet of the data including the symbol with errors is accurately retransmitted is included in the retransmission request signal.

20. The non real-time broadcast receiving method of claim 19, further comprising transmitting the retransmission request signal including the retransmission acknowledgement signal to the return channel server through the return channel.

* * * * *